United States Patent
Kobayashi

(10) Patent No.: US 9,346,349 B2
(45) Date of Patent: May 24, 2016

(54) SHUTTER ABNORMALITY NOTIFICATION APPARATUS FOR VARIABLE DUCT

(71) Applicant: Fuji Jukogyo Kabushiki Kaisha, Tokyo (JP)

(72) Inventor: Yuji Kobayashi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/594,257

(22) Filed: Jan. 12, 2015

(65) Prior Publication Data
US 2015/0197148 A1 Jul. 16, 2015

(30) Foreign Application Priority Data

Jan. 16, 2014 (JP) ................................. 2014-005599

(51) Int. Cl.
*B60R 22/00* (2006.01)
*B60K 11/08* (2006.01)

(52) U.S. Cl.
CPC ........... *B60K 11/085* (2013.01); *B60Y 2306/15* (2013.01)

(58) Field of Classification Search
CPC ... B60K 11/085; B60K 11/08; B60Y 2306/15
USPC .......................................................... 701/49
See application file for complete search history.

(56) References Cited

U.S. PATENT DOCUMENTS

| 8,571,749 | B2 | 10/2013 | Kawato | |
|---|---|---|---|---|
| 2011/0061405 | A1* | 3/2011 | Watanabe | B60H 1/3227 62/61 |
| 2011/0118931 | A1 | 5/2011 | Kawato | |
| 2013/0223980 | A1* | 8/2013 | Pastrick | F01D 5/00 415/1 |
| 2013/0338870 | A1* | 12/2013 | Farmer | B60K 11/085 701/29.2 |
| 2014/0005897 | A1* | 1/2014 | Hayakawa | B60K 11/085 701/49 |
| 2014/0297081 | A1* | 10/2014 | Asami | B60L 3/0061 701/22 |
| 2014/0335778 | A1* | 11/2014 | Takanaga | B60K 11/085 454/333 |

FOREIGN PATENT DOCUMENTS

JP 2011-105221 6/2011

* cited by examiner

*Primary Examiner* — Hussein A. Elchanti
(74) *Attorney, Agent, or Firm* — Troutman Sanders LLP

(57) ABSTRACT

A shutter abnormality notification apparatus issues a notification of an abnormality in a shutter of a variable duct that is provided in a vehicle front end to be capable of adjusting an amount of introduced outside air by moving the shutter. The apparatus includes: an electric circuit that becomes conductive when the shutter and a receiver that receives the shutter contact each other in a duct seal constituted by the shutter and the receiver while the shutter is in the closed position; and a notifier that issues a warning when the electric circuit becomes non-conductive even though an opening operation instruction has not been issued in relation to the shutter in the closed position.

4 Claims, 8 Drawing Sheets

SHUTTER ABNORMALITY NOTIFICATION APPARATUS FOR VARIABLE DUCT

CROSS-REFERENCE TO RELATED APPLICATIONS

The present application claims priority from Japanese Patent Application No. 2014-005599, filed on Jan. 16, 2014, the entire contents of which are hereby incorporated by reference.

BACKGROUND

1. Technical Field

The present invention relates to an apparatus that issues a notification of an abnormality in a shutter that opens and closes a duct provided in a front end of a vehicle.

2. Related Art

A variable duct is provided in a front end of a vehicle, and an amount of outside air introduced into the vehicle is adjusted via the duct by operating a shutter provided in the duct to an open/closed position. As a result, an aerodynamic performance is improved and engine overcooling is prevented, enabling an improvement in fuel economy.

In cold regions, ice and snow may cause the shutter to seize up, thereby becoming inoperable. More specifically, when slats forming the shutter or a slat and a duct inner wall become stuck to each other such that the duct becomes inoperable while in a closed condition, heat may accumulate in the duct, causing the engine to overheat or the like, and as a result, the vehicle may malfunction.

Japanese Unexamined Patent Application Publication (JP-A) No. 2011-105221 discloses a vehicle grille control mechanism including a shutter that opens and closes a duct extending from a front grille of the vehicle to an engine room, an electric motor that drives the shutter, and a controller that controls the duct to open and close by applying a current to the drive motor in order to drive the shutter until a lock current value is detected.

When a time from the start of a duct opening/closing operation to detection of the lock current value exceeds a predetermined time within a preset range, the vehicle grille control mechanism performs a confirmation operation in which the opening/closing operation is repeated, and when the time continues to exceed the predetermined time thereafter, the vehicle grille control mechanism determines that an operating condition of the shutter is abnormal.

According to this vehicle grille control mechanism, an abnormality in the shutter is determined on the basis of the time from the start of the duct opening/closing operation to detection of the lock current value, and therefore a driver of the vehicle can be informed of the abnormality before the engine overheats or the like such that the vehicle can no longer travel. Accordingly, the driver of the vehicle can forestall a vehicle malfunction by limiting an output or halting travel.

With the vehicle grille control mechanism according to JP-A No. 2011-105221, however, even in a case where seizure of the shutter due to ice and snow or the like can be foreseen, it is only possible to determine an abnormality after confirming that the shutter is inoperable by performing the confirmation operation.

Hence, with the vehicle grille control mechanism according to JP-A No. 2011-105221, it is impossible for a vehicle passenger to learn that the shutter is frozen, and to take measures in response thereto, either before the shutter seizes up completely due to the ice and snow and so on or at an early stage of seizure. Further, once the vehicle passenger learns that the shutter has become inoperable, the freezing is already advanced, and therefore a large amount of time is required to remove the ice.

Moreover, a problem remains in that once the shutter is determined to be abnormal, the shutter is invariably already inoperable, and in this case, therefore, the vehicle passenger must always take measures such as limiting output and halting travel.

SUMMARY OF THE INVENTION

The present invention has been designed in consideration of these points, and an object thereof is to provide a shutter abnormality notification apparatus for a vehicle having a variable duct, which is capable of issuing a notification of an abnormality in a shutter at an early stage where the shutter starts to seize up due to ice and snow adhered thereto.

A first aspect of the present invention provides a shutter abnormality notification apparatus that issues a notification of an abnormality in a shutter of a variable duct having a duct that leads outside air introduced through a vehicle front end into a vehicle interior, the shutter which is provided in the duct to move between an open position in which the duct is in an open condition and a closed position in which the duct is in a closed condition, and a controller that controls opening and closing of the shutter. The shutter abnormality notification apparatus includes: a closed condition detector that outputs a signal indicating that the shutter is in a correct closed position; and a notifier that issues a warning on the basis of an instruction from the controller when the closed condition detector does not output the signal indicating that the shutter is in the correct closed position even though the controller has not issued an opening operation instruction.

The closed condition detector may be an electric circuit that becomes conductive when the shutter and a receiver that receives the shutter contact each other in a duct seal constituted by the shutter and the receiver while the shutter is in the correct closed position, and the signal indicating that the shutter is in the correct closed position is a signal indicating that the electric circuit is in a conductive condition.

The shutter abnormality notification apparatus may further include a heater that heats the duct seal on the basis of an instruction from the controller when the shutter and the receiver separate from each other so that the electric circuit becomes non-conductive even though the controller has not issued the opening operation instruction.

The electric circuit may become conductive when a conductive member that is provided on one of the shutter and the receiver in the duct seal and includes a plurality of projections contacts a conducting member provided on the other of the shutter and the receiver in a plurality of locations.

DETAILED DESCRIPTION

Next, implementations of the present invention will be described in detail on the basis of the drawings.

(First Implementation)

Referring to FIGS. 1 to 6, a first implementation of a shutter abnormality notification apparatus that is provided in a front end of a vehicle to issue a notification of an abnormality in a shutter provided in a variable duct that adjusts an amount of outside air introduced into the interior of the vehicle by moving the shutter to open and closed positions will be described.

Figure 1:
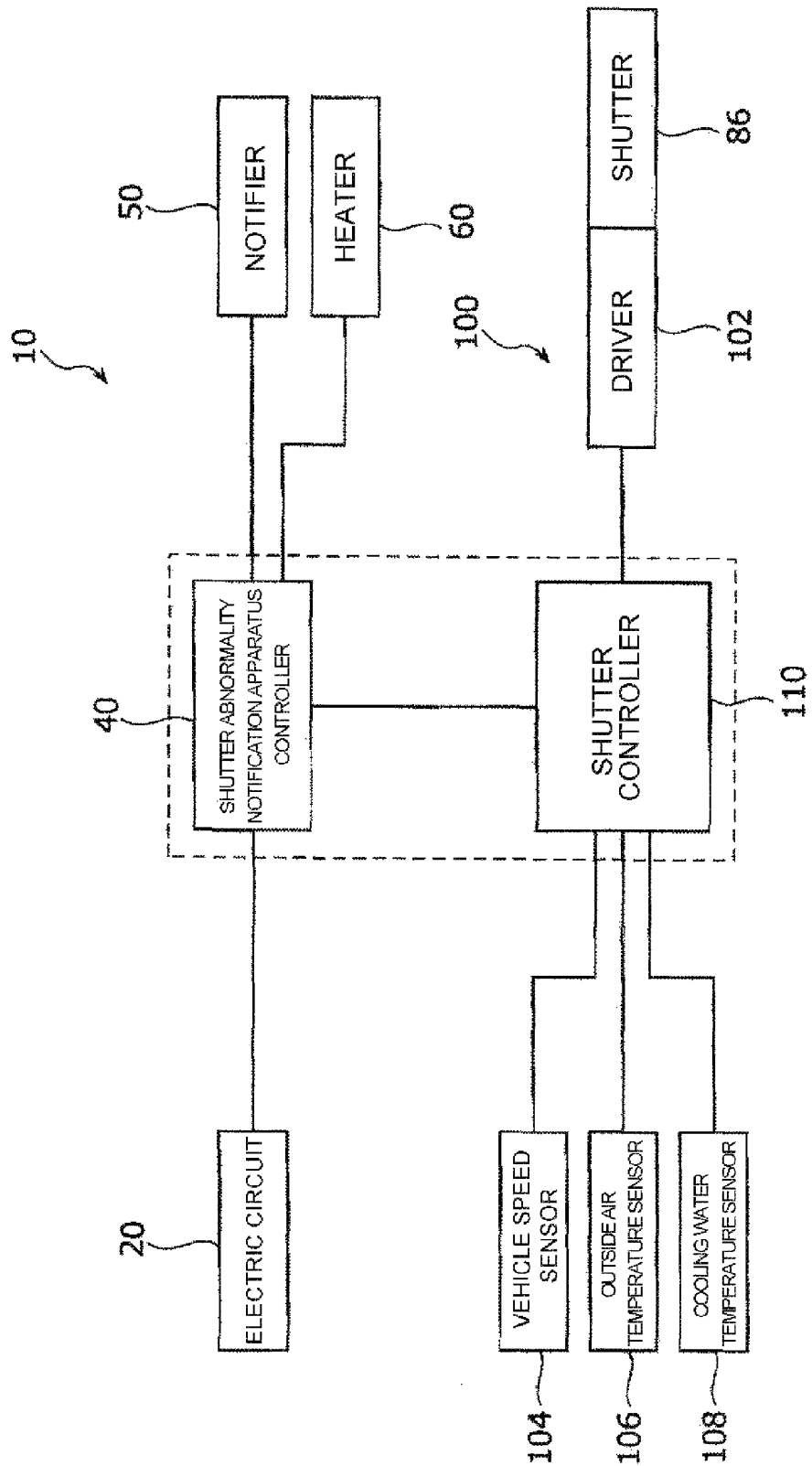
FIG. 1 is a block diagram illustrating an overall configuration of a shutter abnormality notification apparatus for a variable duct according to a first implementation of the present invention.
Figure 2:
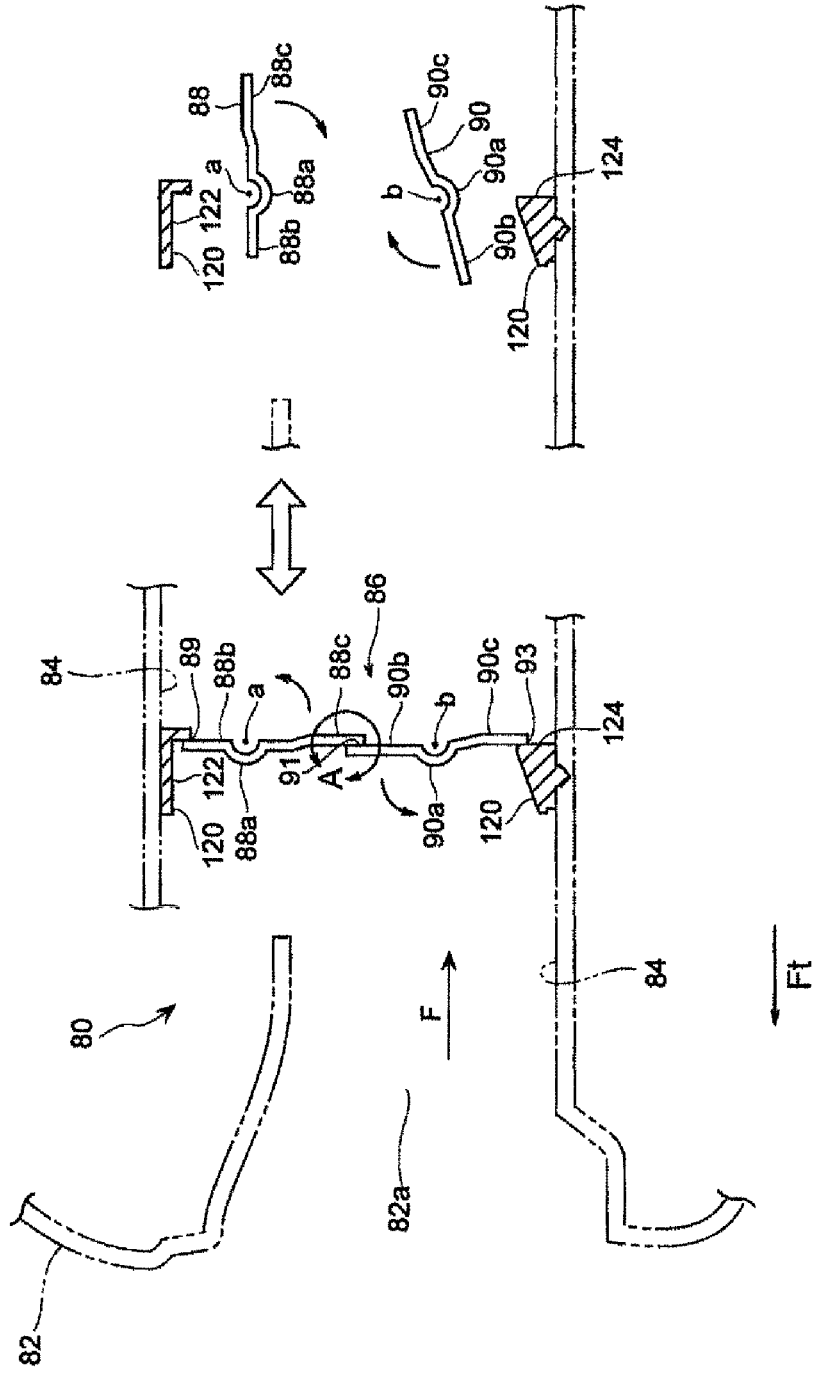
FIGS. 2A and 2B are front-rear direction longitudinal sectional views of a vehicle front end, illustrating the variable duct in which the shutter abnormality notification apparatus according to this implementation is disposed in a closed condition and an open condition, respectively.
Figure 3:
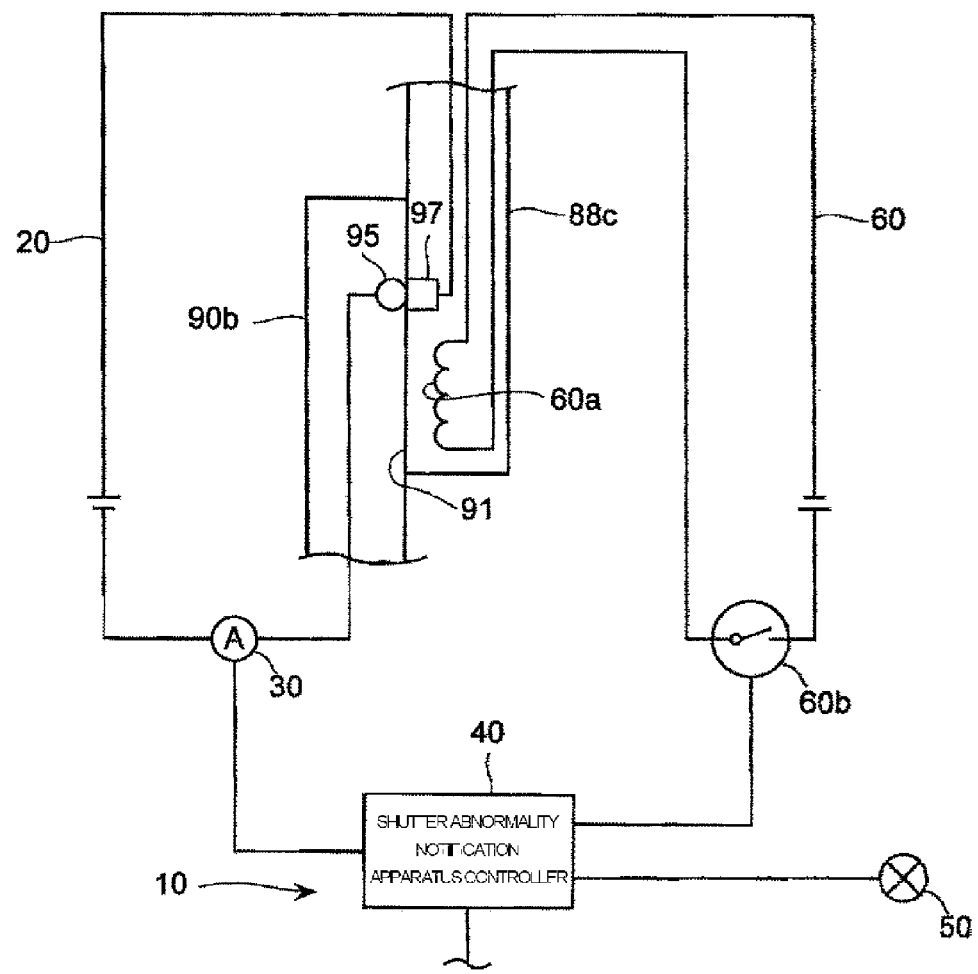
FIG. 3 is a view obtained by adding a main configuration of the shutter abnormality notification apparatus according to this implementation to the enlarged view of a portion A in FIG. 2.
Figure 4A:
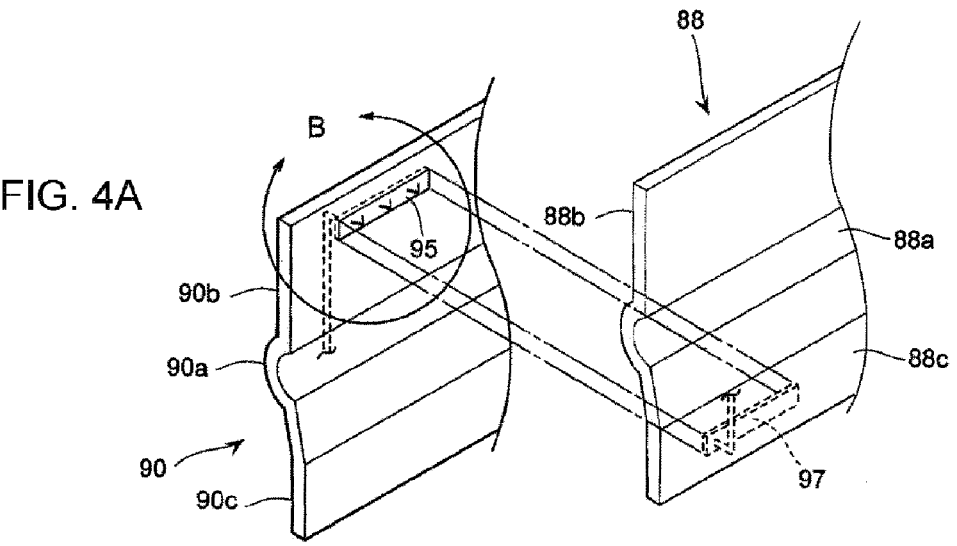
FIGS. 4A-4C are perspective views illustrating a conductive member and a conducting member provided in a shutter that is disposed in a duct seal of the shutter abnormality notification apparatus according to this implementation.
Figure 4B:
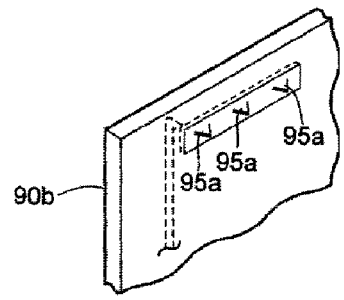
Figure 4C:
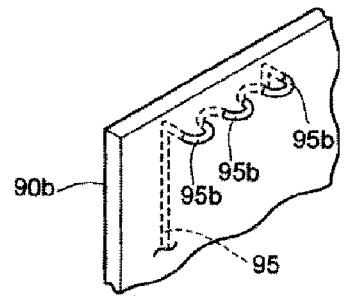
Figure 5:
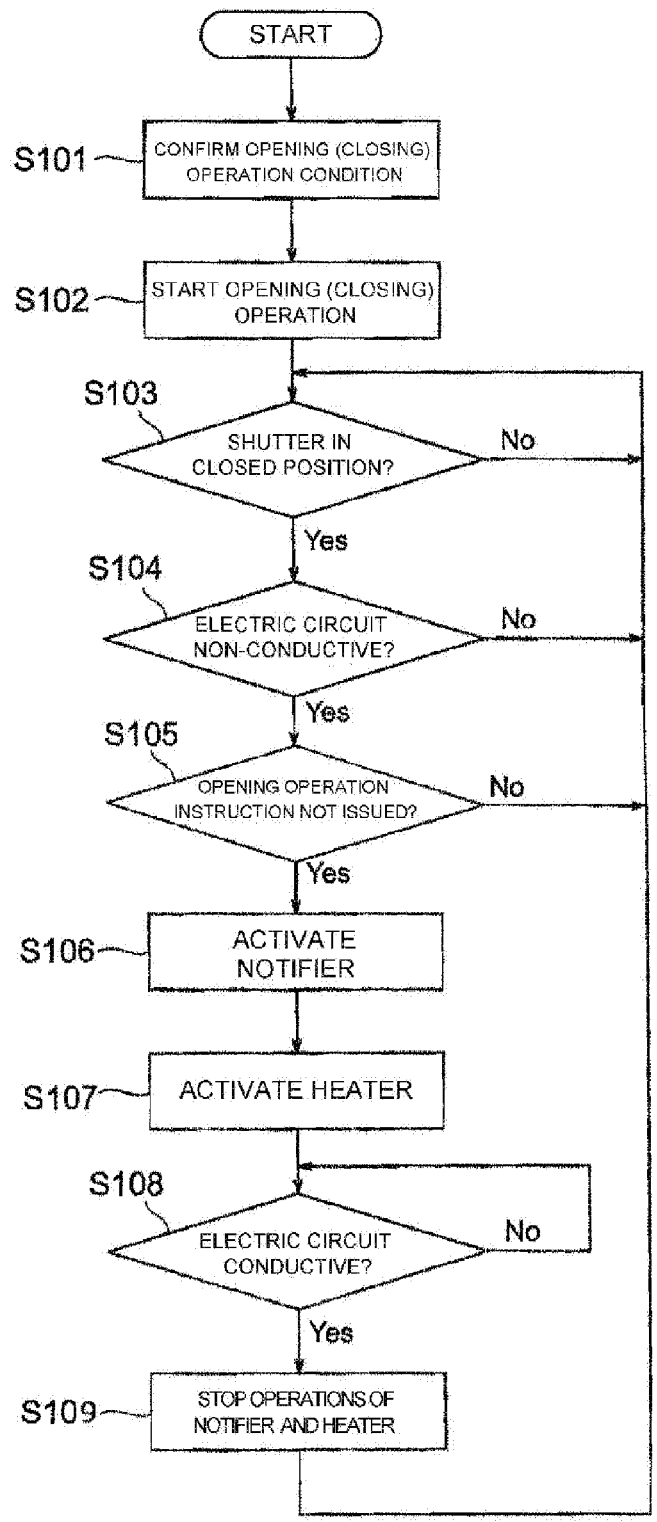
FIG. 5 is a flowchart illustrating an operation of the shutter abnormality notification apparatus according to this implementation.
Figure 6:
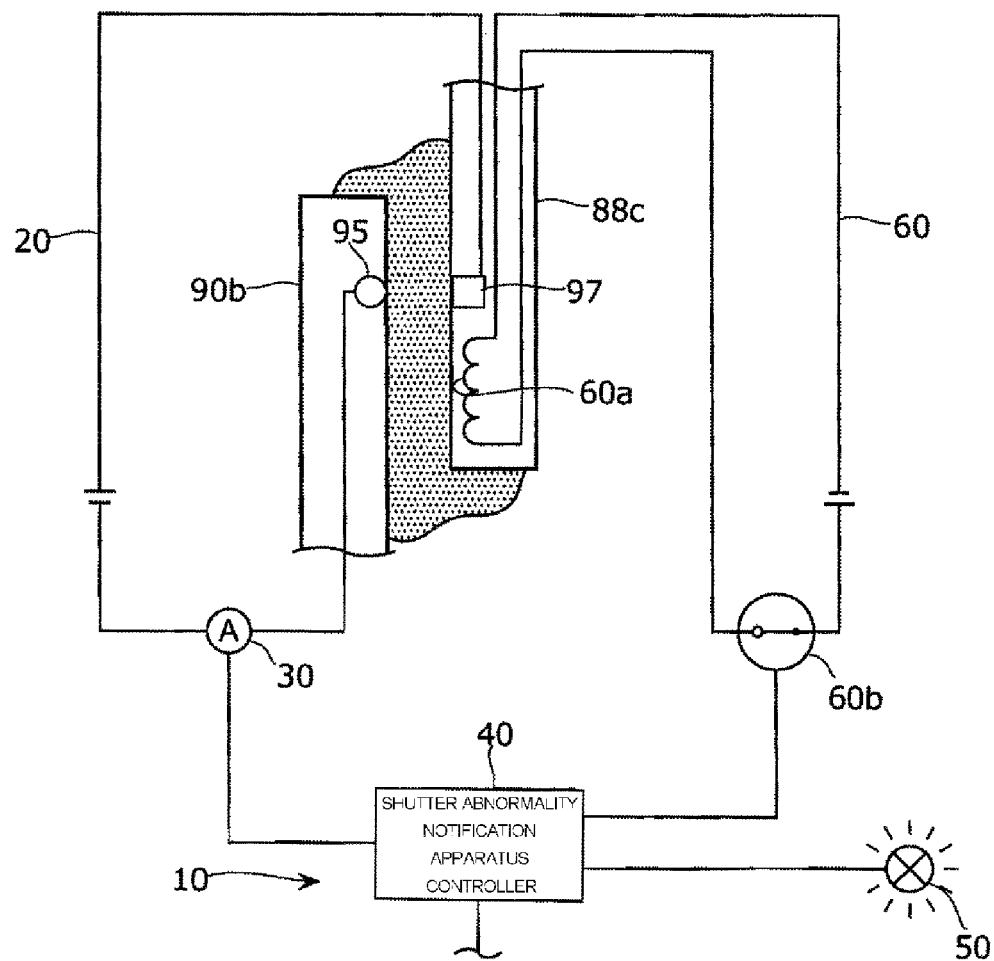
FIG. 6 is a view illustrating the shutter abnormality notification apparatus according to this implementation after issuing a notification of an abnormality in the shutter.

FIG. 1 is a block diagram illustrating an overall configuration of the shutter abnormality notification apparatus for a variable duct according to this implementation. FIGS. 2A and 2B are front-rear direction longitudinal sectional views of a vehicle front end, illustrating the variable duct in which the shutter abnormality notification apparatus according to this implementation is disposed in a closed condition and an open condition, respectively. FIG. 3 is a view obtained by adding a main configuration of the shutter abnormality notification apparatus according to this implementation to the enlarged view of a portion A in FIG. 2. FIGS. 4A-4C are perspective views illustrating a conductive member and a conducting member provided in a shutter that is disposed in a duct seal of the shutter abnormality notification apparatus according to this implementation. FIG. 5 is a flowchart illustrating an operation of the shutter abnormality notification apparatus according to this implementation. FIG. 6 is a view illustrating the shutter abnormality notification apparatus according to this implementation after issuing a notification of an abnormality in the shutter. Note that in the drawings, an arrow Ft denotes a vehicle frontward direction and an arrow F denotes an outside air introduction direction. Further, FIG. 2 illustrates a part of a bumper 82 using imaginary lines.

First, a variable duct 80 in which a shutter abnormality notification apparatus 10 according to this implementation is disposed will be described. As illustrated in FIG. 2, the variable duct 80 includes a duct 84 that has a substantially rectangular cross-section in a vehicle width direction and leads outside air introduced through an air grille 82a opened below the bumper 82, which is positioned in the vehicle front end, into the interior of the vehicle, a shutter 86 that is provided in the duct 84, and that blocks the duct 84 when in a closed position so that the duct is closed and opens the duct 84 when in an open position so that outside air can be introduced, and a shutter controller 110 that controls opening and closing of the shutter 86. A radiator, not illustrated in the drawings, is provided behind the shutter 86.

A rectangular frame-shaped frame 120 is fitted into the duct 84 in a midway position in the outside air introduction direction. Bearing devices, not illustrated in the drawings, are interposed in the frame 120, and an upper slat 88 and a lower slat 90 are disposed on the bearing devices via a vertical interval. The shutter 86 is constituted by the upper slat 88 and the lower slat 90.

The frame 120 is made of resin, and as illustrated in FIG. 2A, is formed in the shape of a rectangular frame that is elongated in the vehicle width direction by an upper frame 122 and a lower frame 124, which extend in the vehicle width direction and oppose each other, and side frames, not illustrated in the drawings, that connect left and right ends of the upper frame 122 and the lower frame 124.

The bearing devices, not illustrated in the drawings, are provided respectively on the left and right side frames, and the upper slat 88 and lower slat 90 are supported by the bearing devices to be capable of rotating respectively about an upper side axial center a and a lower side axial center b that extend in parallel in the vehicle width direction.

The upper slat 88 is made of resin, and in the center includes an axial portion 88a that has an arc-shaped cross-section and extends in the vehicle width direction along the upper side axial center a. A rectangular plate-shaped upper fin 88b extends upward from the axial portion 88a, and a rectangular plate-shaped lower fin 88c extends downward from the axial portion 88a.

The lower slat 90 is made of resin, and includes an axial portion 90a that has an arc-shaped cross-section and extends in the vehicle width direction along the lower side axial center b. A rectangular plate-shaped upper fin 90b extends upward from the axial portion 90a, and a rectangular plate-shaped lower fin 90c extends downward from the axial portion 90a.

When the upper slat 88 is in the closed position, as illustrated in FIG. 2A, a tip end of the upper fin 88b contacts the upper frame 122 such that rotation of the upper slat 88 is restricted. Thus, an upper range of the duct 84 is blocked by the upper slat 88. When the lower slat 90 is in the closed position, as illustrated in FIG. 2A, a tip end of the lower fin 90c contacts the lower frame 124 such that rotation of the lower slat 90 is restricted, and a tip end of the upper fin 90b contacts a tip end of the lower fin 88c of the upper slat 88. Thus, a lower range of the duct 84 is blocked.

Hence, when the shutter 86 is in the closed position, a contact portion 89 between the tip end of the upper fin 88b and the upper frame 122, a contact portion 91 between the tip end of the lower fin 88c and the tip end of the upper fin 90b, and a contact portion 93 between the tip end of the lower fin 90c and the lower frame 124 serve respectively as duct seals 89, 91, 93 that fill gaps in the duct 84 serving as an outside air introduction passage that is closed by the shutter 86. In the closed position, contact portions between the side frames, not illustrated in the drawings, and the shutter 86 likewise serve as duct seals. Accordingly, a position of the shutter 86 when the gaps in the duct 84 are filled by the duct seals 89, 91, and 93 will be referred to as a correct closed position.

Here, the upper frame 122, the tip end of the lower fin 88c, and the lower frame 124 will be referred to for convenience as receivers that respectively receive the tip end of the upper fin 88b, the tip end of the upper fin 90b, and the tip end of the lower fin 90c constituting the shutter 86. Note that the tip end of the lower fin 88c and the tip end of the upper fin 90b serve as both parts of the shutter 86 and receivers.

When the upper slat 88 is in the open position, on the other hand, as illustrated in FIG. 2B, the tip end of the upper fin 88b shifts to a horizontal rotation position removed from the upper frame 122, thereby opening the upper range of the duct 84, and when the lower slat 90 is in the open position, as illustrated in FIG. 2B, the tip end of the lower fin 90c shifts to a horizontal rotation position removed from the lower frame 124, thereby opening the lower range of the duct 84.

By rotating the shutter 86 constituted by the upper slat 88 and the lower slat 90 between two positions, namely the closed position and the open position, in this manner, the amount of outside air introduced into the interior of the vehicle through the air grille 82a of the bumper 82 during travel can be adjusted.

Next, opening/closing control performed on the variable duct 80 having the above configuration will be described. The variable duct 80 includes a variable duct control apparatus 100 illustrated in a lower part of the block diagram of FIG. 1. The variable duct control apparatus 100 includes a driver 102 that drives the upper slat 88 and the lower slat 90 (i.e. the shutter 86), a vehicle speed sensor 104 that detects a vehicle speed, an outside air temperature sensor 106, a cooling water temperature sensor 108 that detects a temperature of engine cooling water, and the shutter controller 110 that controls the driver 102. The shutter controller 110 is therefore a constituent element of the variable duct 80 in which the variable duct control apparatus 100 is provided. Note that the driver 102 is constituted by a drive motor and a driving force transmission mechanism interposed between the drive motor and the upper slat 88 and lower slat 90.

The shutter controller 110 is a computer including a central processing unit (CPU), a random access memory (RAM), a read only memory (ROM), and so on. The shutter controller 110 expands a program stored in the ROM to the RAM so as to cause the CPU to execute corresponding processing.

Note that the program is not limited to being stored in the ROM, and may be stored in a non-volatile random access memory (NVRAM). Detection signals from the vehicle speed sensor 104, the outside air temperature sensor 106, and the cooling water temperature sensor 108 are input into the shutter controller 110, and on the basis of the program recorded in the ROM or the like, the shutter controller 110 determines, in accordance with the detection signals, whether an opening operation condition for setting the upper slat 88 and lower slat 90 in the open position or a closing operation condition for setting the upper slat 88 and lower slat 90 in the closed position is established.

For example, when the vehicle speed detected by the vehicle speed sensor 104 is high and the cooling water temperature detected by the cooling water temperature sensor 108 is low, the closing operation is performed to improve travel stability, but when the cooling water temperature detected by the cooling water temperature sensor 108 is high, the opening operation is performed to cool the engine efficiently.

When the shutter controller 110 determines that the opening operation or the closing operation is required, the driver 102 rotates the upper slat 88 and the lower slat 90 on the basis of an opening (closing) operation instruction from the shutter controller 110 to move the upper slat 88 and the lower slat 90 to the open position (see FIG. 2A) in which the duct 84 is opened or the closed position (see FIG. 2B) in which the duct 84 is closed. The upper slat 88 and the lower slat 90 are moved between the open position and the closed position on the basis of a rotation speed that is recorded in advance in the ROM or the like of the shutter controller 110 as a rotation angle of the drive motor corresponding to a rotation amount for rotating the upper slat 88 and the lower slat 90 between the open position and the closed position.

Next, the shutter abnormality notification apparatus 10 according to this implementation, which is controlled in association with the variable duct control apparatus 100, will be described. As illustrated in FIG. 1, the shutter abnormality notification apparatus 10 includes an electric circuit 20 (a closed condition detector) that becomes conductive when the shutter 86 is in the correct closed position, a shutter abnormality notification apparatus controller 40 that transmits a signal to a notifier 50 and a heater 60, to be described below, when the electric circuit 20 is non-conductive, the notifier 50, and the heater 60.

As illustrated in FIG. 3, the electric circuit 20 has an electric contact in the contact portion (the duct seal 91) between the tip end of the lower fin 88c of the upper slat 88 and the tip end of the upper fin 90b of the lower slat 90 in the closed position. Hence, when the lower fin 88c of the upper slat 88 contacts the upper fin 90b of the lower slat 90, conduction is established in the circuit, and when the lower fin 88c of the upper slat 88 separates from the upper fin 90b of the lower slat 90, the circuit becomes non-conductive.

As illustrated in FIG. 4A, the electric contact in the duct seal 91 is a contact point between a metal conductive member 95 that has a rectangular shape when seen from above and is embedded in the tip end of the upper fin 90b of the lower slat 90 and a conducting member 97 constituted by a metal flat plate that has a substantially rectangular shape when seen from above and is embedded in a tip end surface of the lower fin 88c of the upper slat 88 so as to oppose the conductive member 95.

As illustrated in FIG. 4B, the conductive member 95 includes a plurality of cut and raised portions 95a, which are formed as projections having a predetermined elasticity. The cut and raised portions 95a undergo elastic deformation upon contact with the flat plate-shaped conducting member 97, and at the same time as electric contact is established, the upper fin 90b of the lower slat 90 and the lower fin 88c of the upper slat 88 come into surface contact such that the gap between the upper fin 90b of the lower slat 90 and the lower fin 88c of the upper slat 88 is sealed.

Further, as illustrated in FIG. 4C, the conductive member may be formed by passing a single conducting wire of the electric circuit in a thickness direction through the upper fin 90b of the lower slat 90 a plurality of times in a wave shape so that a plurality of bends 95b formed from the conducting wire serve as the plurality of projections.

The projections formed from the bends 95b are pressed into the interior of the lower fin 88c of the upper slat 88 upon contact with the flat plate-shaped conducting member 97, and at the same time as electric contact is established, the upper fin 90b of the lower slat 90 and the lower fin 88c of the upper slat 88 come into surface contact such that the gap between the upper fin 90b of the lower slat 90 and the lower fin 88c of the upper slat 88 is sealed.

A configuration in which the plurality of projections are provided on the conducting member rather than the conductive member may also be employed.

An current detector 30 is provided in the electric circuit 20 to measure a current flowing through the electric circuit 20.

The shutter abnormality notification apparatus controller 40 is a computer including a CPU, a RAM, a ROM, and so on. The shutter abnormality notification apparatus controller 40 expands a program stored in the ROM (or an NVRAM) to the RAM so as to cause the CPU to execute corresponding processing.

The shutter abnormality notification apparatus controller 40 is connected to the shutter controller 110, and thus the shutter abnormality notification apparatus controller 40 and the shutter controller 110 respectively constitute parts of a controller (indicated by a dotted line in FIG. 1) of the shutter abnormality notification apparatus 10 and the variable duct 80. In accordance with the program stored in the ROM, the shutter abnormality notification apparatus controller 40 checks an instruction issued most recently by the shutter controller 110 in relation to the upper slat 88 and the lower slat 90. When the instruction indicates the closing operation and the tip end of the lower fin 88c of the upper slat 88 is in contact with the tip end of the upper fin 90b of the lower slat 90 such that the electric circuit 20 is conductive, the shutter abnormality notification apparatus controller 40 determines that the shutter 86, or in other words the upper slat 88 and the lower slat 90, is in the closed position. Here, a signal (a current value) from the current detector 30 provided in the electric circuit 20 serves as a signal indicating whether or not conduction is established, and therefore the electric circuit 20 functions as the closed condition detector that outputs a signal indicating that the shutter 86 is in the correct closed position.

Thereafter, when the upper slat 88 and the lower slat 90 are determined to be in the closed position and the current value detected by the detector 30 is smaller than a predetermined threshold even though the shutter controller 110 has not instructed the driver 102 to perform the opening operation on the upper slat 88 and the lower slat 90, the electric circuit 20 is determined to be non-conductive, and accordingly, the notifier 50 and heater 60 are activated.

The notifier 50 is a lamp or a buzzer provided on an instrument panel in a vehicle cabin.

The heater 60, as illustrated in FIG. 3, is a heater circuit having a heater portion 60a on the tip end of the lower fin 88c of the upper slat 88. A switch 60b is provided in the circuit. When the switch 60b is connected, the heater 60 heats the duct seal 91 via the heater portion 60a, and when the switch 60b is disconnected, the heater 60 stops heating the duct seal 91.

When the shutter abnormality notification apparatus controller 40 determines that the current value detected by the detector 30 exceeds the predetermined threshold such that the electric circuit 20 is conductive after operating the notifier 50 and the heater 60, the shutter abnormality notification apparatus controller 40 performs control to stop the notifier 50 and the heater 60.

A flow of shutter abnormality notification processing executed by the shutter abnormality notification apparatus controller 40 will be described below on the basis of the flowchart in FIG. 5.

When an ignition key is inserted into the automobile, the shutter controller 110 starts the shutter abnormality notification processing by reading the program recorded in the ROM. In a first step S102, the shutter controller 110 reads the detection values of the vehicle speed sensor 104, the outside air temperature sensor 106, and the cooling water temperature sensor 108, and determines from these detection values whether or not the operation condition of the upper slat 88 and lower slat 90 is established. In step S102, the shutter controller 110 transmits a signal to the driver 102 in accordance with the determination result, whereupon the opening operation or the closing operation is started on the shutter 86.

In step S103, following the start of the opening (closing) operation on the shutter 86, the shutter abnormality notification apparatus controller 40 determines whether or not the shutter 86 is in the closed position. When the shutter 86 is in the closed position (an affirmative determination), the processing advances to step S104, and when the shutter 86 is in the open position (a negative determination), step S103 is repeated.

In step S104, the shutter abnormality notification apparatus controller 40 determines whether or not the electric circuit 20 is non-conductive. When the electric circuit 20 is non-conductive (an affirmative determination), the processing advances to step S105, and when the electric circuit 20 is conductive (a negative determination), the processing returns to step S103.

In step S105, the shutter abnormality notification apparatus controller 40 checks the records of the shutter controller 110 to determine whether or not an opening operation instruction, or in other words an instruction to move the shutter 86 from the closed position to the open position side, has been issued from the variable duct 80 to the driver 102 in relation to the shutter 86 in the closed position. When the opening operation instruction has not been issued (an affirmative determination), the processing advances to step S106, and when the opening operation instruction has been issued (a negative determination), the processing returns to step S103.

In step S106, the shutter abnormality notification apparatus controller 40 transmits a signal to the notifier 50 to activate the notifier 50. In step S107, the shutter abnormality notification apparatus controller 40 transmits a signal to the heater 60 to activate the heater 60. More specifically, if the shutter 86 separates from the closed position in the duct seal 91 even though an opening operation instruction has not been issued, this separation is assumed to be caused by ice crystals that grow when ice adhered to the shutter 86 melts into water so as to infiltrate the duct seal 91 and then refreezes. The notifier 50 notifies a vehicle passenger of this condition, and simultaneously, the heater 60 is activated to melt the ice assumed to be stuck to the duct seal 91.

In step S108, after activating the notifier 50 and the heater 60 in this manner, the shutter abnormality notification apparatus controller 40 determines whether or not the electric circuit 20 is conductive. When the electric circuit 20 is conductive (an affirmative determination), the processing advances to step S109. When the electric circuit 20 is non-conductive (a negative determination), the processing returns to step S103.

In step S109, the shutter abnormality notification apparatus controller 40 transmits signals to the notifier 50 and the heater 60 to stop the operations of the notifier 50 and the heater 60. The processing then returns to step S103.

In other words, in this condition, it is considered that the ice stuck to the duct seal 91 melts such that the sign indicating that the shutter 86 is inoperable disappears, or the inoperable shutter 86 becomes operable. Hence, there is no longer any need for the notifier 50 to issue a notification, and no need to continue to operate the heater 60, and therefore the operations of the notifier 50 and the heater 60 are canceled. The flow of step S103 onward is then executed further in preparation for subsequent freezing of the shutter 86.

With the shutter abnormality notification apparatus 10 according to this implementation, therefore, when ice and snow adhered to the shutter 86 in the closed position are melted by heat in an engine room to form water, and the melted water then starts to refreeze due to exposure to cold air, water adhered to the duct seal 91 also freezes, leading to ice crystal growth. As a result, the tip end of the upper fin 90b of the lower slat 90 forming a part of the shutter 86 separates from the tip end of the lower fin 88c of the upper slat 88 serving as a receiver such that conduction in the electric circuit 20 is blocked. In response, the notifier 50 issues a warning.

Accordingly, the vehicle passenger can learn from the warning that the shutter 86 is showing signs of becoming inoperable at an early stage where the tip end of the upper fin 90b of the lower slat 90 of the shutter 86 positioned in the closed position starts to seize up relative to the receiver (the tip end of the lower fin 88c of the upper slat 88) in the duct seal 91, and can take measures to prevent the shutter 86 from seizing up completely so as to become inoperable before this occurs. Further, even when the shutter 86 seizes up so as to become inoperable, the degree of seizure is likely to be small, and therefore the shutter 86 can be defrosted comparatively easily.

Furthermore, when ice crystals grow in the duct seal 91 while the duct 84 is closed such that conduction is blocked, the duct seal 91 is heated by the heater 60. Hence, the ice crystals can be melted appropriately by the heat generated by the heater 60 at an early stage where the ice crystals are still starting to grow, and therefore seizure of the shutter 86 can be released quickly and effectively either before the shutter 86 becomes inoperable or at an early stage of inoperability.

Moreover, the conductive member 95 provided on the tip end of the upper fin 90b of the lower slat 90 includes the plurality of elastically deforming cut and raised portions 95a (a plurality of projections), and the cut and raised portions 95a contact the conducting member 97 embedded in the tip end surface of the lower fin 88c of the upper slat 88 in a plurality of locations. As a result, the electric circuit 20 has a plurality of electric contacts in the duct seal 91.

Hence, the number of cut and raised portions 95a contacting the conducting member 97 decreases gradually in steps from a point at which the tip end of the upper fin 90b of the lower slat 90 and the receiver (the tip end of the lower fin 88c of the upper slat 88) start to move in a separating direction to a point at which conduction is blocked, and therefore a fixed time width can be provided. Accordingly, this width can be set in consideration of the time required for the shutter 86 to become inoperable due to ice and snow adhered to the shutter 86 and so on.

(Second Implementation)

Next, a second implementation of the shutter abnormality notification apparatus according to the present invention will be described with reference to FIGS. 7 and 8. In the first implementation, the shutter is constituted by a combination of the upper slat 88 and the lower slat 90, but in this implementation, the shutter is formed from a single slat. Note that elements of this implementation that are similar to their counterparts in the first implementation have been allocated identical reference symbols, and description thereof has been omitted.

In this implementation, bearing apparatuses, not illustrated in the drawings, are provided respectively on the left and right side frames, not illustrated in the drawings, of the rectangular frame-shaped frame 120 fitted into the duct 84, and a slat 140 (a shutter 150) is supported by the bearing apparatuses to be capable of rotating about an axial center c extending horizontally in the vehicle width direction in a substantially central height position between the upper frame 122 and the lower frame 124.

The slat 140 is made of resin, and in the center includes an axial portion 140a that has an arc-shaped cross-section and extends in the vehicle width direction along the axial center c. A rectangular plate-shaped upper fin 140b extends upward from the axial portion 140a, and a rectangular plate-shaped lower fin 140c extends downward from the axial portion 140a.

Figure 7:
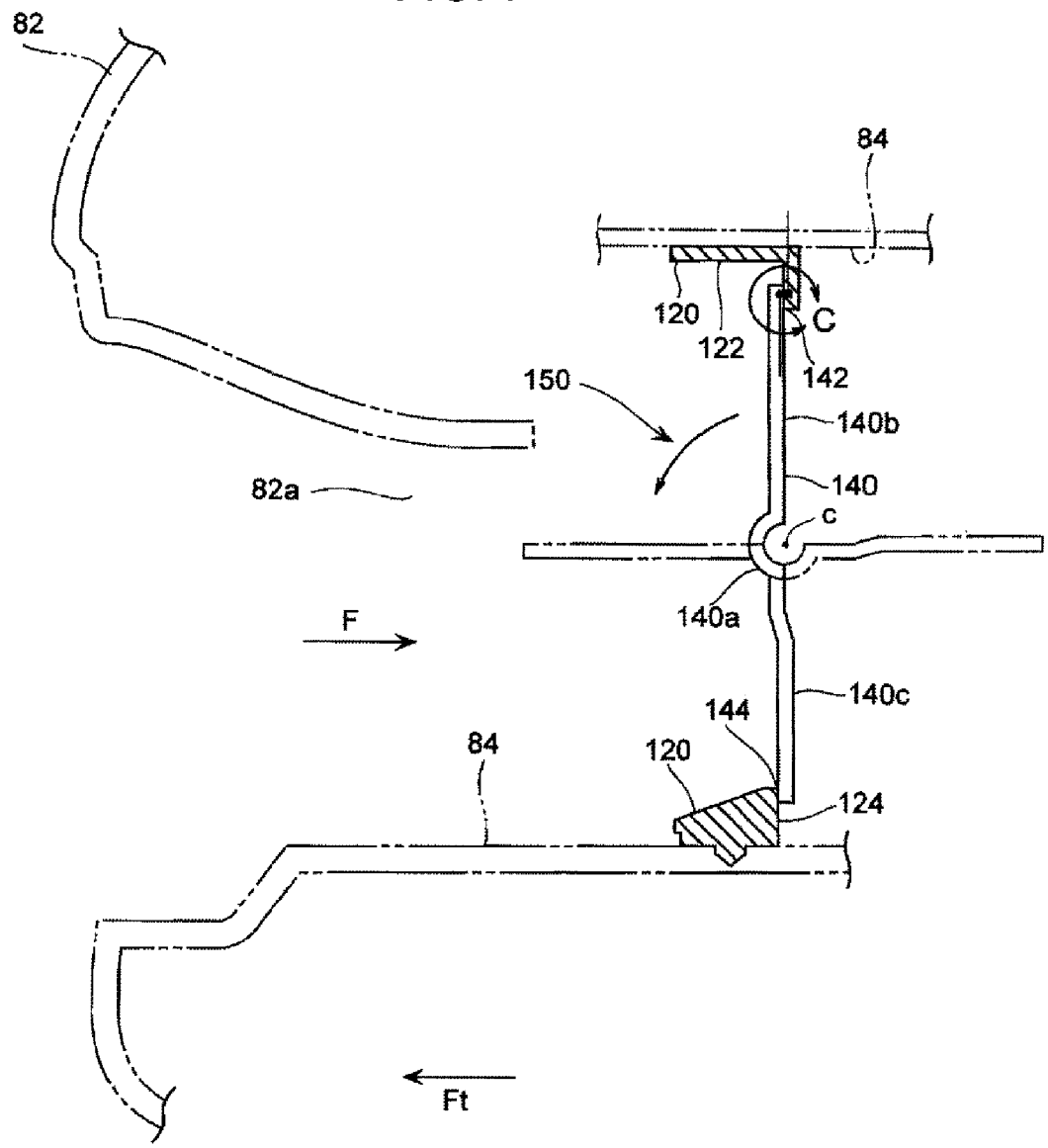
FIG. 7 is a front-rear direction sectional view of a vehicle front end, illustrating a variable duct in which a shutter abnormality notification apparatus according to a second implementation of the present invention is disposed.

When the slat 140 is in a closed position, as illustrated in FIG. 7, a tip end of the upper fin 140b contacts the upper frame 122 and a tip end of the lower fin 140c contacts the lower frame 124. As a result, rotation of the slat 140 is restricted such that the duct 84 is blocked.

Hence, when the shutter 150 is in the closed position, a contact portion 142 between the tip end of the upper fin 140b and the upper frame 122 and a contact portion 144 between the tip end of the lower fin 140c and the lower frame 124 respectively form duct seals 142 and 144 that fill gaps in the duct 84 serving as the outside air introduction passage closed by the shutter 150. In the closed position, contact portions between the side frames, not illustrated in the drawings, and the shutter 150 likewise serve as duct seals.

Here, the upper frame 122 and the lower frame 124 will be referred to for convenience as receivers that respectively receive the tip end of the upper fin 140b and the tip end of the lower fin 140c of the slat 140 constituting the shutter 150.

Meanwhile, as illustrated by an imaginary line in FIG. 7, the duct 84 opens when the slat 140 shifts to a horizontal rotation position in which the tip end of the upper fin 140b is separated from the upper frame 122 and the tip end of the lower fin 140c is separated from the lower frame 124.

Hence, by rotating the shutter 142 constituted by the single slat 140 between two positions, namely the closed position and the open position, the amount of outside air introduced into the vehicle interior through the air grille 82a in the bumper 82 during travel can be adjusted.

As regards the shutter abnormality notification apparatus, the configurations of the electric circuit and the heater differ partially from the first implementation, and description will be limited to these differences.

Figure 8:
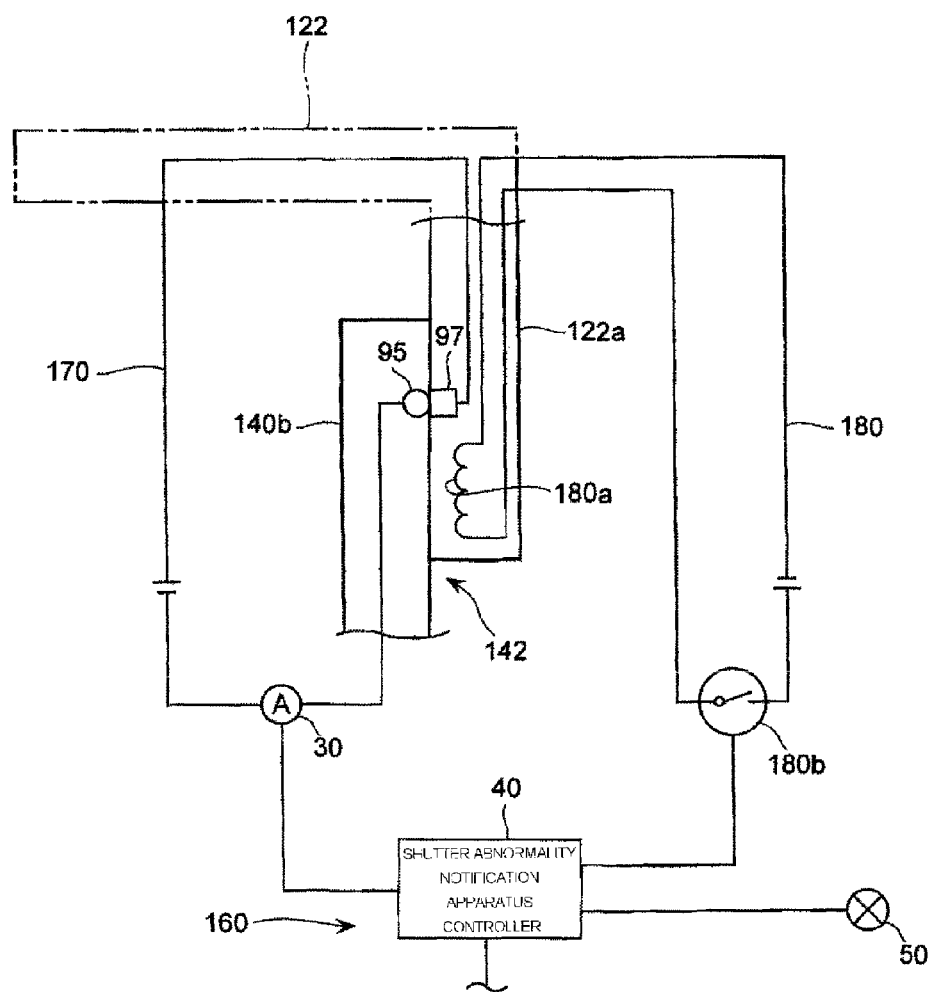
FIG. 8 is a view obtained by adding a main configuration of the shutter abnormality notification apparatus to an enlarged view of a portion C in FIG. 7.

In a shutter abnormality notification apparatus 160 according to this implementation, as illustrated in FIG. 8, an electric circuit 170 has an electric contact in the contact portion 142 (the duct seal 142) between the tip end of the upper fin 140b of the slat 140 in the closed position and the upper frame 122. Hence, when the tip end of the upper fin 140b contacts the upper frame 122, conduction is established in the circuit, and when the tip end of the upper fin 140b separates from the upper frame 122, the circuit becomes non-conductive. The configurations of the conductive member and the conducting member of the electric circuit 170 are unchanged, and therefore description thereof has been omitted.

Further, as illustrated in FIG. 8, a heater 180 is a heater circuit having a heater portion 180a in a projection 122a of the upper frame 122 that projects to the duct 84 side. A switch 180b is provided in the circuit. When the switch 180b is connected, the heater 180 heats the duct seal 142 via the heater portion 180a, and when the switch 180b is disconnected, the heater 180 stops heating the duct seal 142.

Likewise in the shutter abnormality notification apparatus 160 according to this implementation, similarly to the first implementation, the vehicle passenger can learn from the warning that the shutter 150 is showing signs of becoming inoperable at an early stage where the tip end of the upper fin 140b of the slat 140 positioned in the closed position starts to seize up relative to the receiver (the projection 122a of the upper frame 122 that projects to the duct 84 side) in the duct seal 142. Accordingly, seizure of the shutter 150 can be released quickly and effectively using the heater 180 either before the shutter 150 becomes inoperable or at an early stage of inoperability.

The present invention is not limited to the implementations described above, and may be subjected to various modifications within a scope that does not depart from the spirit of the invention. For example, in the above implementations, the shutter is configured as a slat that rotates about an axial center, but the shutter may take various configurations, such as a roll curtain, a double swing door, or a single swing door.

Further, in the above implementations, the heater is included in the shutter abnormality notification apparatus, but this is not a required configuration, and as long as the shutter abnormality notification apparatus is capable of issuing a warning at an early stage of seizure, the object of the present invention is achieved.

According to the present invention, a warning is issued either before the water adhered to the site in which the duct is sealed by the shutter in the closed position freezes such that the shutter becomes inoperable, or at an early stage of inoperability, and therefore measures can be taken to release seizure of the shutter at a comparatively early stage of the seizure. As a result, time and labor expended on these measures can be reduced in comparison with the related art.

Further, when the heater is provided, the shutter can be made operable by activating the heater at an early stage of seizure of the shutter, and therefore measures such as limiting the output and stopping the vehicle are not required. Furthermore, seizure of the shutter can be released quickly using a small amount of heat, and therefore the release operation can be performed economically.

The invention claimed is:

1. A shutter abnormality notification apparatus that issues a notification of an abnormality in a shutter of a variable duct having a duct that leads outside air introduced through a vehicle front end into a vehicle interior, the shutter which is provided in the duct to move between an open position in which the duct is in an open condition and a closed position in which the duct is in a closed condition, and a controller that controls opening and closing of the shutter, the shutter abnormality notification apparatus comprising:

a closed condition detector that outputs a signal indicating that the shutter is in a correct closed position;
wherein the closed condition detector is an electric circuit that becomes conductive when the shutter and a receiver that receives the shutter in the correct closed position touch each other while the shutter is in the correct closed position;
wherein the signal indicating that the shutter is in the correct closed position is a signal indicating that the electric circuit is in a conductive condition; and
a notifier that issues a warning on the basis of an instruction from the controller when the closed condition detector does not output the signal indicating that the shutter is in the correct closed position even though the controller has not issued an opening operation instruction.

2. The shutter abnormality notification apparatus according to claim 1, further comprising a heater that heats the duct seal on the basis of an instruction from the controller when the shutter and the receiver separate from each other so that the electric circuit becomes non-conductive even though the controller has not issued the opening operation instruction.

3. The shutter abnormality notification apparatus according to claim 1, wherein the electric circuit becomes conductive when a conductive member that is provided on either one of the shutter and the receiver in the duct seal and includes a plurality of projections contacts a conducting member provided on the other of the shutter and the receiver in a plurality of locations.

4. The shutter abnormality notification apparatus according to claim 2, wherein the electric circuit becomes conductive when a conductive member that is provided on either one of the shutter and the receiver in the duct seal and includes a plurality of projections contacts a conducting member provided on the other of the shutter and the receiver in a plurality of locations.

* * * * *